United States Patent Office 3,044,971
Patented July 17, 1962

3,044,971
POLYURETHANE CATALYST COMPOSITION AND METHOD FOR PREPARING CELLULAR POLYURETHANE USING SAME
Samuel Polis, Pittsburgh, Pa., assignor to Mobay Chemical Company, Pittsburgh, Pa., a corporation of Delaware
No Drawing. Filed Mar. 18, 1959, Ser. No. 800,096
10 Claims. (Cl. 260—2.5)

This invention relates generally to the preparation of cellular polyurethane plastics and, more particularly, to a method for making improved cellular polyurethanes and to a novel catalyst mixture therefor.

It has been proposed heretofore to react an organic polyisocyanate with an organic compound having groups containing hydrogen atoms reactive with an —NCO group to form a polyurethane plastic having a porous structure. Although it has been proposed to prepare a cellular polyurethane by such a process when using a polyalkylene ether glycol, cellular polyurethanes prepared from polyesters obtained by esterification of a polyhydric alcohol and a polycarboxylic acid have, until recently, met with the most commercial success. Cellular polyurethanes are ordinarily prepared from a polyester by a one-step process in which the polyester, organic polyisocyanate, catalyst, water and other components are all mixed together at one time. It has been necessary in order to produce an entirely satisfactory cellular polyurethane from a polyalkylene ether alcohol, however, to prepare the product in a two-step process. In such a process, the polyalkylene ether alcohol is reacted in a first step under substantially anhydrous conditions to produce a prepolymer or adduct having terminal —NCO groups. Then in a second step, the prepolymer is mixed with water and chemical reaction is effected between the water and terminal —NCO groups of the prepolymer and monomeric polyisocyanate, such as, for example, toluylene diisocyanate, which is present in the mixture. Carbon dioxide is formed during this reaction and becomes entrapped in the viscous reaction mixture as chain-lengthening of the prepolymer occurs. The resulting product has a porous structure.

It is an object of this invention to provide a method for making a cellular polyurethane plastic from a polyalkylene ether alcohol by a one-step method. Another object of the invention is to provide an improved method for making cellular polyurethanes when using a polyalkylene ether alcohol of high molecular weight wherein the polyalkylene ether alcohol, organic polyisocyanate, catalyst, blowing agent, and other components of the reaction mixture can all be mixed together simultaneously. Still another object of the invention is to provide an improved catalyst mixture which permits the preparation of a cellular polyurethane plastic from a polyalkylene ether alcohol by a process in which all of the components of the reaction mixture may be mixed together substantially simultaneously. A more specific object of the invention is to provide a method for making cellular polyurethanes in which all of the reaction components are mixed together substantially simultaneously and the cellular polyurethane thus obtained has improved heat stability.

The foregoing objects and others which will become apparent from the following disclosure are accomplished in accordance with this invention, generally speaking, by providing a method for making a cellular polyurethane by reacting a polyalkylene ether alcohol having from 2 to 4 hydroxyl groups and a molecular weight of at least about 500 with an organic polyisocyanate in the presence of a mixture containing as the only material required as a catalyst from about 0.01 to about 0.1 part of stannous chloride or an organo-tin compound, defined in more detail hereinafter, from about 0.2 to about 1.5 parts of either N-ethyl morpholine or N-methyl morpholine and from about 0.1 part to about 0.3 part triethylene diamine per 100 parts by weight polyalkylene ether alcohol. The invention is predicated upon the discovery that an organic polyisocyanate, a polyalkylene ether alcohol having from 2 to 4 hydroxyl groups and a molecular weight of at least about 500, water or other suitable blowing agent, catalyst and emulsifier or other components of a reaction mixture can all be mixed together substantially simultaneously and that the resulting product will be heat stable even at a temperature of about 140° C. or higher provided the catalyst mixture does not vary appreciably from the composition set forth immediately hereinbefore. The ratio of the components of the catalyst must be 0.01 to 0.1 stannous chloride or organo-tin compound per 0.2 to 1.5 parts N-alkyl morpholine per 0.1 to 0.3 part triethylene diamine in order for the reaction rate to be satisfactory and for the product to have desirable physical characteristics. It has been found that if the amount of stannous chloride or organo-tin compound is reduced below the minimum amount set forth above, chemical reaction does not proceed at a rate suitable to permit mixing of all of the components together at one time. If on the other hand, the amount of stannous chloride or organo-tin compound is increased above about 0.1 part per 100 parts of the polyalkylene ether alcohol, the resulting product is subject to substantial degradation at temperatures of 140° C. or above.

Organo-tin compounds suitable for use as a component of the catalyst mixture are a stannous salt of a carboxylic acid having from 1 to 8 carbon atoms including stannous octoate, stannous oleate and the like, a trialkyl tin oxide in which the alkyl groups contain from 1 to 8 carbon atoms, a dialkyl tin chloride in which the alkyl groups contain from 1 to 8 carbon atoms, a dialkyl tin oxide in which the alkyl groups contain from 1 to 8 carbon atoms or a dialkyl tin salt of a carboxylic acid having from 1 to 18 carbon atoms in which the alkyl groups contain from 1 to 8 carbon atoms including dibutyl tin dilaurate, dibutyl tin diacetate, diethyl tin diacetate, dihexyl tin diacetate and dibutyl tin-di(2 ethylhexoate). The invention thus contemplates a catalyst mixture for use in the preparation of cellular polyurethanes containing as the sole components added only for catalytic purposes from about 0.01 part to about 0.1 part of one of these organo-tin compounds or stannous chloride or mixtures thereof, from about 0.2 to about 1.5 parts N-ethyl morpholine or N-methyl morpholine or mixtures thereof and from about 0.1 part to about 0.3 part triethylene diamine per 100 parts by weight polyalkylene ether alcohol. Preferably the stannous chloride or organo-tin compound of the catalyst mixture is mixed with the polyalkylene ether alcohol before the other components are added and the tertiary amines are added at the same time as the polyisocyanate but as a separate stream. Alternatively, the tin compound can be mixed with the two tertiary amines and the resulting mixture then mixed with the polyalkylene ether alcohol, organic polyisocyanate and other components of the reaction mixture. Of the various organo-tin compounds disclosed herein as suitable for the process, it has been found that best results are obtained with dibutyl tin-di(2 ethylhexoate) and dibutyl tin-diacetate. Preferably, the catalyst mixture should contain about 0.05 part organo-tin compound, about 0.5 part N-ethyl morpholine and about 0.2 part triethylene diamine per 100 parts polyalkylene ether alcohol. It is, of course, possible to mix a stabilizer and/or emulsifier or other additive component to the catalyst mixture.

Best results are obtained when the reaction mixture contains an organo siloxane as a stabilizer. Any silicone compound known to stabilize a reaction mixture of this type may be used, but a siloxane oxyalkylene block copolymer having the formula

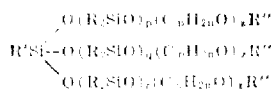

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34 is particularly advantageous. Organo silicone compounds of this type and a method for making them are disclosed in U.S. Patent 2,834,748.

Although the catalyst mixture is most advantageous because of its utility in a one-step process where all of the ingredients of the reaction mixture are brought together substantially simultaneously, the catalyst mixture can also be used in a two-step process in which a prepolymer is formed in a first step under substantially anhydrous conditions by reaction between a polyalkylene ether alcohol and an organic polyisocyanate. Then in a second step, the resulting prepolymer having terminal —NCO groups is reacted with water to form a cellular product. The amount of catalyst used in the two-step process is substantially the same as that used in the one-step process. The catalyst can be added to the mixture in either step but it is preferred to add it in the second step. The novel catalyst mixture is advantageous over heretofore known catalysts even in the two-step process because it results in the formation of a heat-stable product having improved softness and being substantially free from objectionable odors within a very short period of time after it is formed.

Any suitable polyalkylene ether alcohol having from 2 to 4 hydroxyl groups and a molecular weight of at least about 500 may be used in the process provided by this invention. Examples of suitable polyalkylene ether alcohols include those prepared by condensation of an alkylene oxide having from 2 to 5 carbon atoms, such as, for example, polypropylene ether glycol, polyethylene ether glycol, polybutylene ether glycol or a glycol prepared from a mixture of two or more alkylene oxides, such as, for example, ethylene oxide, propylene oxide, butylene oxide, amylene oxide, and the like. A polyalkylene ether glycol prepared by polymerization of tetrahydrofuran or mixtures of these ether glycols with the condensation product of an alkylene oxide may also be used. Moreover, the condensation product of an alkylene oxide having from 2 to 5 carbon atoms and a polyhydric alcohol having from 3 to 4 hydroxyl groups, such as, for example, glycerine, trimethylol propane, triethanolamine, triethylolpropane, pentaerythritol, hexanetriol and the like, may be used provided the molecular weight of the condensation product is at least about 500. The polyalkylene ether alcohols may be prepared by any known condensation process, such as, for example, by the process described by Wurtz in 1859 and in "Encyclopedia of Chemical Technology," vol. 7, pp. 257 to 262, published by Interscience Publishers, Incorporated, 1951, or in U.S Patent 1,922,459. A mixture of one of these polyalkylene ether alcohols and a monomeric polyhydric alcohol such as, for example, glycerine, trimethylol propane, pentaerythritol and the like, may be used. Preferably, the hydroxyl number of the polyalkylene ether alcohol will not be above about 225 and it will seldom be below about 25.

Any suitable organic polyisocyanate including those disclosed in United States Reissue Patent 24,514 to Hoppe et al. issued August 12, 1958, may be used. Arylene diisocyanates are preferred, such as, for example, 2,4-toluylene diisocyanate, 2,6-toluylene diisocyanate, p,p'-diphenylmethane diisocyanate, 1,5-naphthalene diisocyanate and the like. Best results have been obtained up to this time with an isomeric mixture of about 20% 2,6-toluylene diisocyanate and about 80% 2,4-toluylene diisocyanate.

As indicated hereinbefore, cellular polyurethanes prepared in accordance with the process described herein have all of the advantages of cellular polyurethanes prepared from polyalkylene ether alcohols heretofore and the added advantage of being more stable against degradation when subjected to high temperatures. For example, it has been found that the product of this invention is stable against any substantial amount of degradation at a temperature of 140° C. for more than 16 hours while cellular polyurethanes prepared from the same reaction components and from the same catalytic compounds but in different proportions are subject to severe degradation when heated at 140° C. for only 2 hours. It is apparent from the results of physical tests made on cellular polyurethanes prepared in accordance with this invention and a cellular polyurethane prepared by the same manipulative steps and from the same components but with a catalyst mixture containing a different ratio of tin compound and tertiary amines after heating in a hot air oven that the product of this invention has superior heat stability.

| | Catalyst Parts/ 100 Parts Polypropylene Ether Glycol | | | Hours Heated at 140° C. | Physical Characteristics After Heating Period | |
|---|---|---|---|---|---|---|
| | I | II | III | | Tensile Strength, p.s.i. | Elongation, percent |
| Sample A | 0.2 | 0.2 | 0.075 | 0<br>2<br>6(X)<br>24(X) | 19<br>12.5<br>7.4<br>7.3 | 240<br>230<br>100<br>1 |
| Sample B | 0.1 | 1 | 0.2 | 0<br>24 | 15<br>14.5 | 200<br>255 |
| Sample C | 0.05 | 0.6 | 0.1 | 0<br>120 | 16.3<br>17.7 | 240<br>250 |

The center of the samples marked (X) had completely decomposed after the heat period converting the original solid block of cellular polyurethane into a hollow one.

The catalysts in the foregoing table designated I, II and III are dibutyl tin-di(2 ethylhexoate), N-ethyl morpholine and triethylene diamine, respectively. The cellular polyurethanes designated Samples A, B and C were all prepared in accordance with the embodiment of Example 1 hereinafter except that the catalyst consisted of the amounts of dibutyl tin-di(2 ethylhexoate), N-ethyl morpholine and triethylene diamine as shown in the table above.

In order better to describe and further clarify the invention, the following are specific embodiments thereof.

*Example 1*

About 100 parts by weight of a polypropylene ether trihydric alcohol having an average molecular weight of about 3,000 and an hydroxyl number of about 56 and prepared by condensation of propylene oxide with glycerine, about 38 parts by weight of a mixture of 80% 2,4-toluylene diisocyanate and about 20% 2,6-toluylene diisocyanate, about 3 parts water, about 1.3 parts by weight of a catalyst mixture composed of about 0.1 part dibutyl tin-di(2 ethylhexoate), about 1 part N-ethyl morpholine, and about 0.2 part triethylene diamine, and about 1 part of a silicone compound having the formula

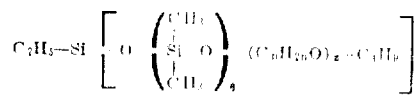

wherein $(C_nH_{2n}O)$ represents about 17 oxyethylene units and about 13 oxypropylene units and the value of z is thus about 30, are mixed together substantially simultaneously with an apparatus of the type disclosed in U.S. Patent 2,764,565. All of the components are substantially uniformly mixed together substantially instantaneously in this apparatus by injecting the (1) organic diisocyanate, (2) catalyst mixture and (3) water-silicone mixture as separate streams into the polyalkylene ether alcohol being continuously fed into the mixing chamber of the apparatus. The resulting mixture is continuously discharged from the apparatus before any substantial amount of chemical reaction between the components has proceeded. Chemical reaction proceeds after discharge of the reaction mixture with accompanying expansion and foaming of the mixture into a cellular product which solidifies to form a cellular polyurethane plastic having a density of about 2 pounds per cubic foot.

Example 2

About 100 parts by weight of a polyalkylene ether trihydric alcohol prepared by condensation of propylene oxide and glycerine and having a molecular weight of about 3,000 and an hydroxyl number of about 56, about 40 parts of a mixture of about 20% 2,6-toluylene diisocyanate and about 80% 2,4-toluylene diisocyanate, about 0.78 part of a catalyst mixture containing about 0.03 part dibutyl tin-di(2 ethylhexoate), about 0.5 part N-ethyl morpholine, and about 0.25 part triethylene diamine, about 3 parts water and about 1 part of a compound having the formula

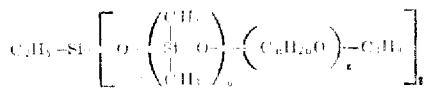

wherein $(C_nH_{2n}O)$ represents about 17 oxyethylene units and about 13 oxypropylene units and the value of z is thus about 30, are mixed together substantially simultaneously with an apparatus of the type disclosed in U.S. Patent 2,764,565. Mixing is achieved in the apparatus in the same manner as described in Example 1 and the resulting cellular polyurethane, after solidification, has a density of about 2 pounds per cubic foot.

Example 3

About 100 parts by weight of a polypropylene ether glycol having a molecular weight of about 2,000 and an hydroxyl number of about 56, about 38 parts of a mixture of about 80% 2,4-toluylene diisocyanate and about 20% 2,6-toluylene diisocyanate, about 1.3 parts of a catalyst mixture composed of about 0.1 part dibutyl tin-di(2 ethylhexoate), about 1 part N-ethyl morpholine and about 0.2 part triethylene diamine, about 3 parts water and about 2 parts of a compound having the formula

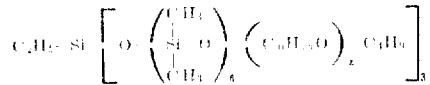

wherein $(C_nH_{2n}O)$ represents about 17 oxyethylene units and about 13 oxypropylene units and the value of z is thus about 30, are mixed together substantially simultaneously with an apparatus of the type disclosed in U.S. Patent 2,764,565. The components are mixed together in the apparatus in the manner described in the foregoing examples and after the mixture has been discharged and chemical reaction has proceeded, the resulting cellular product has a density of about 2 pounds per cubic foot and is stable against degradation at about 140° C. for more than 16 hours.

Example 4

A mixture of about 50 parts by weight polypropylene ether trihydric alcohol having an average molecular weight of about 3,000 and an hydroxyl number of about 56 and prepared by condensation of propylene oxide with glycerine and about 50 parts by weight polypropylene ether glycol having a molecular weight of about 2,000 and an hydroxyl number of about 56 are mixed with about 38 parts by weight of a mixture of 80% 2,4-toluylene diisocyanate and about 20% 2,6-toluylene diisocyanate, about 3 parts water, about 1.3 parts by weight of a catalyst mixture composed of about 0.1 part dibutyl tin-di(2-ethyl hexoate), about 1 part N-ethyl morpholine and about 0.2 part triethylene diamine, and about 1 part of a silicone compound having the formula

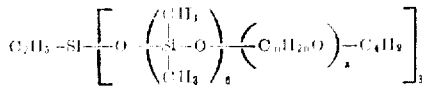

wherein $(C_nH_{2n}O)$ represents about 17 oxyethylene units and about 13 oxypropylene units and the value of z is thus about 30, are mixed together substantially simultaneously with an apparatus of the type disclosed in U.S. Patent 2,764,565. All of the components are substantially uniformly mixed together substantially instantaneously in this apparatus by injecting the (1) organic diisocyanate, (2) catalyst mixture and (3) water-silicone mixture as separate streams into the polyalkylene ether alcohol being continuously fed into the mixing chamber of the apparatus. The resulting mixture is continuously discharged from the apparatus before any substantial amount of chemical reaction between the components has proceeded. Chemical reaction proceeds after discharge of the reaction mixture with accompanying expansion and foaming of the mixture into a cellular product which solidifies to form a cellular polyurethane plastic having a density of about 2 pounds per cubic foot.

It will be understood that any other polyalkylene ether alcohol disclosed as suitable herein can be substituted for the specific ones used in the foregoing examples. Likewise, any other organic polyisocyanate disclosed as suitable herein may be substituted for the isomeric mixture of toluylene diisocyanate used in the examples. Moreover, any other catalyst mixture in so long as the components and ratio specified hereinbefore are used may be substituted by the specific catalyst mixture used in these examples.

Although all silicone compounds represented by the general formula given hereinbefore are broadly contemplated, best results have been obtained with a compound having the formula

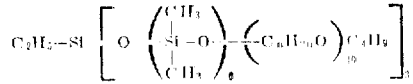

wherein $(C_nH_{2n}O)$ is a mixed polyoxyethylene and oxypropylene block containing about 17 oxyethylene units and about 13 oxypropylene units. Hence, it is preferred to use this compound in conjunction with the novel catalyst set forth herein to prepare a cellular polyurethane. It has been found that the combination of catalyst and silicone provided by this invention can be used to best advantage in preparing a cellular polyurethane from a polyalkylene ether alcohol having a secondary hydroxyl group, such as, for example, a polypropylene ether glycol or the condensation product of propylene oxide and a polyhydric alcohol.

The density of the product will vary with the amount of water used. Preferably, from about 1.5 to about 5 parts water per 100 parts polyalkylene ether alcohol is used. Preferably, the amount of organic polyisocyanate used is an amount about equivalent to the reactive hydrogen atoms of the polyalkylene ether alcohol and water. That is to say any amount of polyisocyanate from slightly less than the theoretically equivalent amount to an excess over the theoretical amount can be used but an equivalent amount is preferred.

As indicated hereinbefore, the catalyst provided by this invention can be used to prepare a cellular polyurethane by reaction of a polyalkylene ether alcohol having a molecular weight of at least about 500, an organic polyisocyanate and an inert gas blowing agent under substantially anhydrous conditions. Any suitable inert gas or gas producing material, such as, for example, air, carbon dioxide, methylene chloride, nitrogen, dichlorodifluoromethane, or the like, may be used. The catalyst may be dissolved in any suitable solvent. The methylene chloride or dichlorodifluoromethane or other gas producing material may be used as a solvent. Other suitable solvents include acetone, ethyl acetate, hexane and the like. The gas blowing agent may be any material which is a gas at the temperature at which the foaming reaction occurs. Preferably, the foaming reaction is carried out at a temperature somewhere between room temperature of about 20° C. and about 100° C. Usually, only an amount of polyisocyanate equivalent to the hydroxyl groups of the polyalkylene ether alcohol will be required although any excess over that amount can be used. In fact, the blowing might be achieved by a combination of an added inert gas and gas produced by reaction of water with a polyisocyanate.

The cellular product provided by this invention is particularly advantageous for use as sponges or in upholstering furniture and for making underlay for carpets. It may also be used in arm rests on the interior of vehicles.

Triethylene diamine has the formula

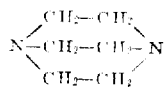

Examples of suitable trialkyl tin oxides include triethyl tin oxide, tributyl tin oxide, methyl dibutyl tin oxide, trihexyl tin oxide and the like. Examples of suitable dialkyl tin chlorides and dialkyl tin oxides include dibutyl tin chloride, dibutyl tin oxide, dihexyl tin chloride, diethyl tin oxide and the like.

Although the tin containing compound can be mixed with the tertiary amines, it is advisable in some instances to mix the tin compound with the N-alkyl morpholine and the siloxane stabilizer and provide a separate mixture of water and triethylene diamine. The two mixtures are injected into the polyalkylene ether alcohol separately. In other instances, the tin compound, both tertiary amines and the siloxane can be mixed together and this mixture and water injected into the polyalkylene ether alcohol separately.

Although the invention has been described in considerable detail in the foregoing, it is to be understood that such detail is solely for the purpose of illustration and that many variations can be made by those skilled in the art without departing from the spirit and scope of the invention except as is set forth in the claims.

What is claimed is:

1. As a new composition of matter, an improved catalyst for chemical reactions which produce a polyurethane foam comprising (1) a member selected from the group consisting of a trialkyl tin oxide in which the alkyl groups contain from 1 to 5 carbon atoms, a dialkyl tin chloride in which the alkyl groups contain from 1 to 8 carbon atoms, a dialkyl tin oxide in which the alkyl groups contain from 1 to 8 carbon atoms and a dialkyl tin salt of a carboxylic acid having from 1 to 18 carbon atoms in which the alkyl groups contain from 1 to 8 carbon atoms, (2) an N-alkyl morpholine selected from the group consisting of N-ethyl morpholine and N-methyl morpholine and (3) triethylene diamine in the ratio of from about 0.01 part to about 0.1 part of (1) per about 0.2 part to about 1.5 part of (2) and about 0.1 part to about 0.3 part of (3).

2. As a new composition of matter, an improved catalyst for chemical reactions which produce a polyurethane foam comprising (1) dibutyl tin-di(2-ethylhexoate), (2) N-ethyl morpholine, and (3) triethylene diamine in the ratio of from about 0.01 part to about 0.1 part of (1) per about 0.2 part to about 1.5 part of (2) and about 0.1 part to about 0.3 part of (3).

3. A method for making a cellular polyurethane plastic which comprises reacting an organic polyisocyanate with a polyalkylene ether alcohol having from 2 to 4 hydroxyl groups, a molecular weight of a least about 500 and an hydroxyl number of not more than about 225 in a reaction mixture containing an inert gas and a catalyst comprising from about 0.01 part to about 0.1 part of a member selected from the group consisting of a trialkyl tin oxide in which the alkyl groups contain from 1 to 8 carbon atoms, a dialkyl tin chloride in which the alkyl groups contain from 1 to 8 carbon atoms, a dialkyl tin oxide in which the alkyl groups contain from 1 to 8 carbon atoms and a dialkyl tin salt of a carboxylic acid having from 1 to 18 carbon atoms in which the alkyl groups contain from 1 to 8 carbon atoms, from about 0.2 part to about 1.5 part of an N-alkyl morpholine selected from the group consisting of N-ethyl morpholine and N-methyl morpholine and from about 0.1 part to about 0.3 part triethylene diamine per 100 parts by weight polyalkylene ether alcohol.

4. A method for making a cellular polyurethane plastic which comprises reacting an organic polyisocyanate, a polyalkylene ether alcohol having from 2 to 4 hydroxyl groups and a molecular weight of at least about 500 and an hydroxyl number of not more than about 225 and water in a reaction mixture containing from about 0.01 part to about 0.1 part of a member selected from the group consisting of a trialkyl tin oxide in which the alkyl groups contain from 1 to 8 carbon atoms, a dialkyl tin chloride in which the alkyl groups contain from 1 to 8 carbon atoms, a dialkyl tin oxide in which the alkyl groups contain from 1 to 8 carbon atoms, and a dialkyl tin salt of a carboxylic acid having from 1 to 18 carbon atoms in which the alkyl groups contain from 1 to 8 carbon atoms, from about 0.2 part to about 1.5 part of an N-alkyl morpholine selected from the group consisting of N-ethyl morpholine and N-methyl morpholine and from about 0.1 part to about 0.3 part triethylene diamine per 100 parts by weight polyalkylene ether alcohol.

5. A method for making a cellular polyurethane plastic which comprises mixing substantially simultaneously an organic polyisocyanate, a polyalkylene ether alcohol having from 2 to 4 hydroxyl groups, a molecular weight of about 3000 and an hydroxyl number of about 56, water and a catalyst comprising from about 0.01 part to about 0.1 part of a member selected from the group consisting of a trialkyl tin oxide in which the alkyl groups contain from 1 to 8 carbon atoms, a dialkyl tin chloride in which the alkyl groups contain from 1 to 8 carbon atoms, a dialkyl tin oxide in which the alkyl groups contain from 1 to 8 carbon atoms and a dialkyl tin salt of a carboxylic acid having from 1 to 18 carbon atoms in which the alkyl groups contain from 1 to 8 carbon atoms, from about 0.2 part to about 1.5 part of an N-alkyl morpholine selected from the group consisting of N-ethyl morpholine and N-methyl morpholine and from about 0.1 part to about 0.3 part triethylene diamine per 100 parts by weight polyalkylene ether alcohol.

6. The process of claim 5 wherein the tin compound in the catalyst is dibutyl tin-di(2-ethylhexoate).

7. The process of claim 3 wherein the tin compound is dibutyl tin-di(2 ethylhexoate).

8. The process of claim 3 wherein the polyalkylene ether alcohol is a triol having a molecular weight of about 3,000 and prepared by condensation of an alkylene oxide having from 2 to 5 carbon atoms and a polyhydric alcohol selected from the group consisting of glycerine, trimethylol propane, hexanetriol and triethanolamine.

9. The method of claim 4 wherein the tin compound is dibutyl tin-di(2 ethylhexoate).

10. The process of claim 3 wherein the polyalkylene ether alcohol is a polypropylene ether triol and the polyisocyanate is toluylene diisocyanate.

References Cited in the file of this patent
UNITED STATES PATENTS 2,866,774    Price _____ Dec. 30, 1958

OTHER REFERENCES

Mobay publication, "A One Shot System for Flexible Polyether-Urethane Foams," November 10, 1958, 4 pages.
Union Carbide pub., "One-Step Urethane Foams," F-40487, February 1959, 5 pages.
"Dabco," pub. of Houdry Process Corp., December 3, 1957; 6 pages.

UNITED STATES PATENT OFFICE
CERTIFICATE OF CORRECTION

Patent No. 3,044,971                                  July 17, 1962

Samuel Polis

It is hereby certified that error appears in the above numbered patent requiring correction and that the said Letters Patent should read as corrected below.

Column 2, line 33, for "1 to 8 carbon atoms" read -- 1 to 18 carbon atoms --.

Signed and sealed this 12th day of November 1963.

(SEAL)
Attest:

ERNEST W. SWIDER                              EDWIN L. REYNOLDS

Attesting Officer                                Acting Commissioner of Patents